(No Model.)
2 Sheets—Sheet 1.
C. LOSER.
VELOCIPEDE.
No. 303,530. Patented Aug. 12, 1884.
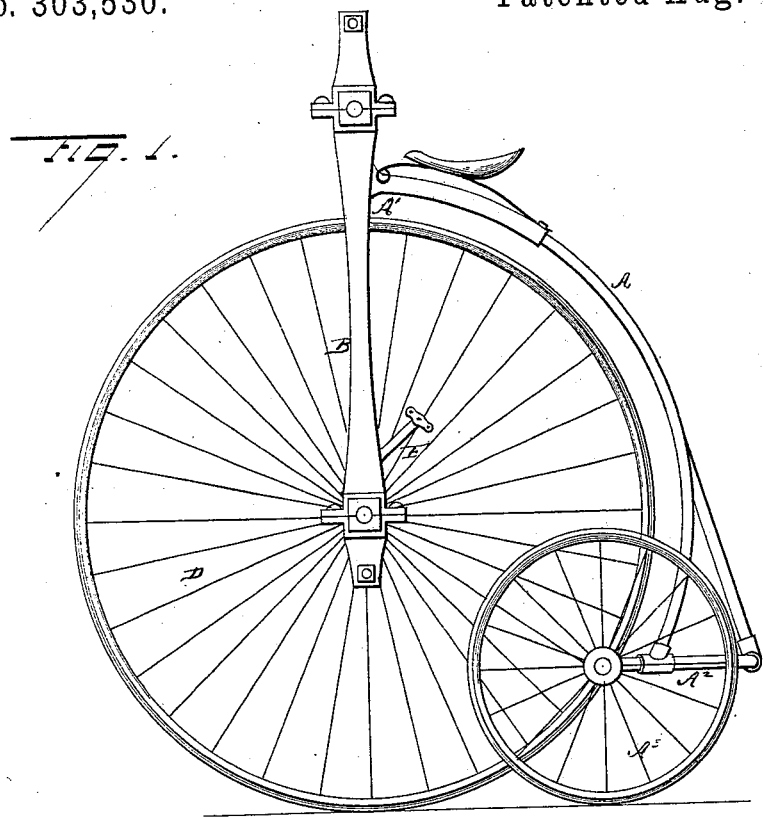
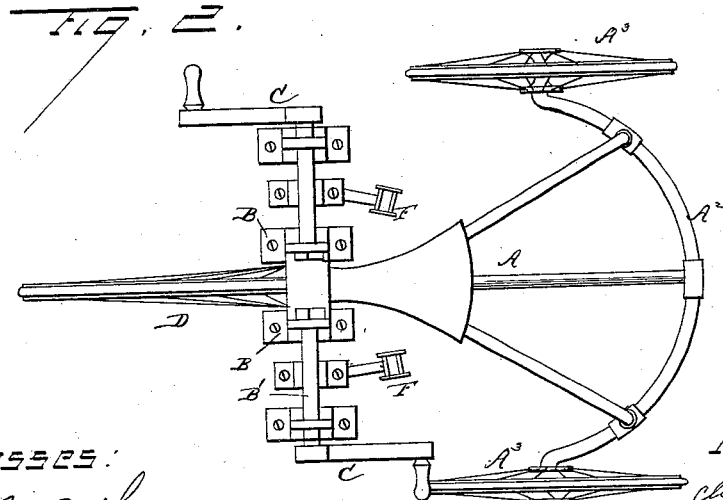
Witnesses:
H. C. McArthur
Chas. Kressmann
Inventor.
Charles Loser
per
H. Harrison
Attorney.

(No Model.) 2 Sheets—Sheet 2.
C. LOSER.
VELOCIPEDE.
No. 303,530. Patented Aug. 12, 1884.
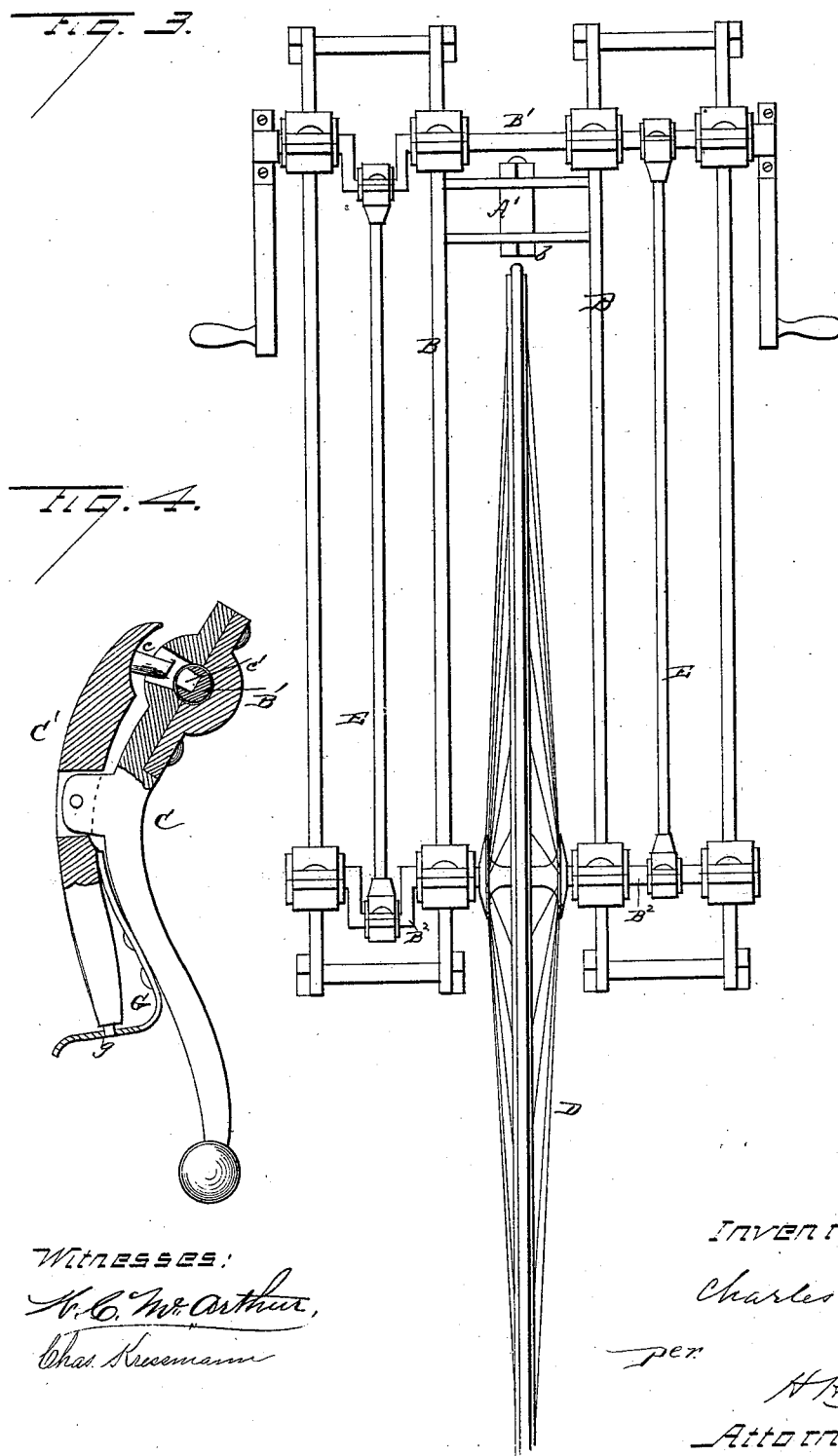

UNITED STATES PATENT OFFICE.

CHARLES LOSER, OF CHICAGO, ILLINOIS.

VELOCIPEDE.

SPECIFICATION forming part of Letters Patent No. 303,530, dated August 12, 1884.

Application filed November 30, 1883. (No model.)

*To all whom it may concern:*

Be it known that I, CHARLES LOSER, a citizen of the United States, residing at Chicago, in the county of Cook and State of Illinois, have invented certain new and useful Improvements in Velocipedes, of which the following is a specification, to wit:

This invention relates to an improvement in velocipedes; and it consists in certain peculiarities of construction and arrangement, substantially as will be hereinafter more fully set forth.

In order to enable others skilled in the art to which my invention appertains to make and use the same, I will now proceed to describe its construction and operation, referring to the accompanying drawings, in which—

Figure 1 is a side elevation; Fig. 2, a plan view; Fig. 3, a front elevation, and Fig. 4 a detail view of one of the cranks.

A represents the backbone of the velocipede, consisting of three portions secured at their upper ends to the neck A', and at their lower ends to a curved rear axle, A², upon the ends of which are carried the rear wheels, A³. The neck A' is pivoted upon a bolt, $b$, in a frame, B, having two cranked shafts, B' B², the upper of which is provided on its ends with crank-handles C C. The lower shaft, B², carries the main driving-wheel D, and the two shafts are connected by pitmen E E, which are provided with pedals F for the feet. The crank-handles C C are arranged to be used or not, at the will of the operator, the crank being placed loosely upon the shaft and provided with a pivoted dog, C' C', pivoted on a lug projecting from the face of the crank, and having on its inner end a pin, $c$, which passes through the crank and engages with a notch or hole, $c'$, in the shaft. The outer end of this dog is provided with a spring, G, the inner end of which bears against the under side of the dog and throws it into engagement with the shaft, while the outer end of the spring rests against the end of the dog, and is formed with a hole, $g$, with which the dog engages to hold it free from the shaft. The velocipede made in this way is much easier to run, the operator having both feet and hands in use, thus obtaining more power over rough roads or over hills, and the crank-handles may at any time be disconnected and allowed to hang free, and the machine operated by the feet alone.

It is obvious that the device may be applied to vehicles having two, three, or more wheels, and the same result produced.

Having thus fully described my invention, what I claim as new, and desire to secure by Letters Patent, is—

1. In a velocipede, the crank C, in combination with the dog C', having a pin, $c$, passing through the crank-bearing, and the spring G, adapted either to hold the dog in engagement or disengagement with the shaft at the will of the operator, substantially as and for the purpose set forth.

2. In a velocipede, the frame B, swiveled to the backbone and provided with two cranked shafts, B' B², connected by rigid pitmen E, carrying the pedals F, in combination with the main driving-wheel D upon the lower shaft, and the cranks C C upon the upper, arranged, as herein shown, to be attached or disconnected at will, substantially as and for the purpose set forth.

In testimony whereof I affix my signature in presence of two witnesses.

CHARLES LOSER.

Witnesses:
E. H. DUGNESUE,
HENRY GRAF.